Feb. 12, 1963   J. T. MATTINGLY   3,077,113
ROCKET PORT CLOSURE
Filed July 11, 1961
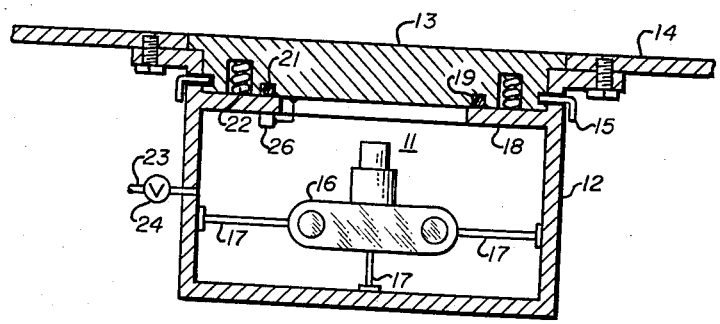
INVENTOR.
JAMES T. MATTINGLY
BY
ATTORNEY

United States Patent Office 3,077,113
Patented Feb. 12, 1963

3,077,113
ROCKET PORT CLOSURE
James Thomas Mattingly, Danville, Calif., assignor to the United States of America as represented by the United States Atomic Energy Commission
Filed July 11, 1961, Ser. No. 123,321
3 Claims. (Cl. 73—431)

The present invention relates to closures for observation ports and, more particularly, to a pressure-actuated port closure that can be set to open at a predetermined altitude.

Most of our present knowledge concerning the conditions prevailing in the upper reaches of the earth's atmosphere has been obtained through flights of instrument-bearing rockets. In order to obtain accurate data from such flights, it is often desirable to bring the detecting sections of certain instruments into direct contact with the environment to be measured. This is particularly true of instruments which measure radiation intensity and particle flux, i.e., ultraviolet detectors, bolometers, proportional counters, mass spectrometers, etc. In each of these cases, the presence of an observation "window" interposed between the detector and the external environment attenuates the incoming radiant energy or particle flux, thereby introducing inaccuracies into the data recorded by the detecting instrument.

The ideal detecting case is one in which there is no observation window of any kind, that is, an open port through which the detector is in direct contact with the environment to be measured. It would be possible to provide such observation ports by merely cutting holes in the rocket hull, if it were not for the fact that the presence of these holes would increase the drag forces acting on the rocket in its passage through the initial high density layers of the earth's atmosphere.

The present invention provides a simple pressure-actuated closure, whereby windowless observation ports are opened to the atmosphere at preselected altitudes. Basically, the closure comprises a disk which seals a windowles observation port in a rocket hull. An evacuated instrument compartment is affixed to the rocket hull adjacent the inner surface of the disk, while the outer disk surface is exposed to the atmosphere through which the rocket is traveling. The pressure differential between the evacuated instrument compartment and the relatively high pressure external atmosphere forces the disk against the edge of the observation port, thereby effecting a tight seal. Several small compression springs are disposed between the disk and the rocket hull so as to exert a slight outward force against the disk. The instrument compartment is evacuated to a pressure equal to the atmospheric pressure existing at the altitude at which it is desired that the closure should open. When the rocket reaches this preselected altitude, the inwardly directed atmospheric force on the disk is just equalled by the residual air pressure force within the instrument compartment, and the compressed springs project the disk away from the rocket hull, thereby uncovering the open observation port. The separation of the disk from the rocket hull actuates a switch which energizes the mechanism of a detecting instrument contained within the instrument compartment.

Accordingly, it is an object of the invention to provide an automatically opening closure for instrument observation ports.

A further object of the invention is to provide an observation port closure which can be set to open at a preselected altitude.

The invention will be described with reference to the accompanying drawing, of which the sole figure is a cross sectional view of a preferred embodiment of the invention.

Referring now to the drawing, there is shown an evacuated instrument compartment 11, which is defined by a wall 12 and a closure disk 13. Compartment 11 is disposed adjacent the inner surface of a space vehicle hull 14. The closure disk 13 is positioned relative to wall 12 by a number of removable locking pins 15. A detecting instrument 16, such as a bolometer, is supported within compartment 11 by a number of supporting struts 17, which are fixed at one end to wall 12. Closure disk 13 is seated upon an annular shoulder 18 which projects inward from wall 12 into compartment 11. An annular groove 19, wherein a gasket 21 is disposed, is formed into the inner surface of disk 13 so that gasket 21 bears against annular shoulder 18. A number of small compression springs 22 are disposed in equally spaced holes along the periphery of disk 13, and exert force against both the disk and shoulder 18. A conduit 23, equipped with a valve 24, extends through wall 12 and communicates with compartment 11. Detecting instrument 16 is electrically energized through a switch 26, whose contacts are held open by the pressure of disk 13 against shoulder 18.

In the operation of the invention, compartment 11 is evacuated via conduit 23 and valve 24, and locking pins 15 are withdrawn. The external atmospheric pressure forces disk 13 tightly against shoulder 18, thereby compressing gasket 21 to form an effective seal for compartment 11. The vehicle is launched and, when an altitude is reached where the atmospheric pressure is equal to the pressure within compartment 11, springs 22 project the closure disk away from the rocket hull. The separation of the disk actuates switch 26, thereby energizing detecting instrument 16, which then measures the external environment through the open port created by the ejection of the closure disk.

As mentioned previously, the closure can be set to open at any preselected altitude by evacuating instrument compartment 11 to a pressure equal to the atmospheric pressure corresponding to the altitude selected. It is apparent, therefore, that the maximum altitude for which the closure can be set to open is limited only by the degree of vacuum which can be achieved and maintained in the instrument compartment. In the FIGURE, the gasket seal is shown as a simple O-ring type; seals of this type can generally be fabricated to hold vacuum pressures on the order of $10^{-6}$ mm. Hg for periods of several hours. Other vacuum seals are well known in the art, and the lowest pressure maintainable in the instrument compartment could be reduced to about $10^{-8}$ mm. Hg through the use of conventional seals of more sophisticated design. Table I lists the correspondence between altitude and atmospheric pressure for altitudes up to 160 kilometers. It can be seen from this table that the simple O-ring type seal shown in the FIGURE would permit reliable operation of the port closure up to a maximum altitude of about 160 kilometers, i.e., an atmospheric pressure of approximately $10^{-6}$ mm. Hg. This maximum operational altitude may be extended considerably through the use of conventional labyrinth vacuum seals. The O-ring seal was chosen as a preferred vacuum sealing means because it is inexpensive, easily replaced, and requires the least amount of adjustment to achieve an effective seal.

TABLE I

| Altitude Above Sea Level (in kilometers) | Atmospheric Pressure (in millimeters of mercury) |
|---|---|
| 0 | 760 |
| 10 | 210 |
| 20 | 42 |
| 30 | 9.5 |
| 40 | 2.4 |
| 50 | $7.5 \times 10^{-1}$ |
| 60 | $2.1 \times 10^{-1}$ |
| 70 | $5.4 \times 10^{-2}$ |
| 80 | $1.0 \times 10^{-2}$ |
| 90 | $1.9 \times 10^{-3}$ |
| 100 | $4.2 \times 10^{-4}$ |
| 110 | $1.2 \times 10^{-4}$ |
| 120 | $3.5 \times 10^{-5}$ |
| 130 | $1.5 \times 10^{-5}$ |
| 140 | $7.0 \times 10^{-6}$ |
| 150 | $3.0 \times 10^{-6}$ |
| 160 | $2.0 \times 10^{-6}$ |

Although a preferred embodiment of the invention has been described, various modifications may be made therein without departing from the spirit and scope of the invention as defined in the following claims.

What is claimed is:

1. In combination with a detecting instrument supported within an evacuatable compartment having an open port communicating with an external environment, an automatically opening port closure comprising a closure plate adapted to fit into and close said open port, seating means whereby said closure plate is supported within the opening of said port, vacuum sealing means disposed between and in contact with both said closure plate and said seating means, a plurality of compressible resilient members disposed between and exerting force against both said closure plate and said seating means, removeable locking means securing said closure plate within the opening of said port, and a normally-closed instrument energizing switch disposed within said compartment, said normally-closed switch being maintained in its open position through contact with said closure plate.

2. In combination with a detecting instrument supported within an evacuatable compartment having an open port communicating with an external environment, an automatically opening port closure comprising a closure disk whose diameter is substantially equal to the diameter of said open port, an annular disk-supporting shoulder extending radially from a wall defining said evacuatable compartment into the interior thereof, gasket sealing means disposed between and in contact with both said closure disk and said annular shoulder, a plurality of compressible resilient members disposed between and exerting force against both said closure disk and said annular shoulder, a plurality of removeable locking members securing said closure disk within the opening of said port and in contact with said annular shoulder, and a normally-closed instrument energizing switch disposed within said compartment, said normally-closed switch being maintained in its open position through contact with said closure disk.

3. In combination with a detecting instrument supported within an evacuatable compartment having an open port communicating with an external environment, an automatically opening port closure comprising a closure disk whose diameter is substantially equal to the diameter of said open port, an annular disk-supporting shoulder extending radially from a wall defining said evacuatable compartment into the interior thereof, an O-ring gasket disposed in an annular groove formed into a planar surface of said closure disk adjacent said supporting shoulder, said O-ring gasket being in contact with both said annular groove and said annular shoulder, a plurality of compression springs disposed between and exerting force against both said closure disk and said annular shoulder, a plurality of removeable locking pins securing said closure disk within the opening of said port and in contact with said annular shoulder, and a normally-closed instrument energizing switch disposed within said compartment, said normally-closed switch being maintained in its open position through contact with said closure disk.

References Cited in the file of this patent

UNITED STATES PATENTS 2,680,580  Rossire ------------------ June 8, 1954
2,906,125  Jewett ------------------ Sept. 29, 1959